United States Patent [19]
Warning et al.

[11] 3,930,043
[45] Dec. 30, 1975

[54] METHOD FOR MAKING COTTON CANDY

[75] Inventors: Walter B. Warning, Chicago; Walter B. Warning, Jr., Schaumburg, both of Ill.

[73] Assignee: Tec-Pak Corporation, Schiller Park, Ill.

[22] Filed: July 19, 1973

[21] Appl. No.: 380,566

[52] U.S. Cl. .............. 426/515; 425/9; 426/512; 426/516; 426/517; 426/660
[51] Int. Cl.². A23P 1/00; B29C 23/00; A23G 3/00; A23G 3/10
[58] Field of Search ........... 426/213, 214, 380, 512, 426/515, 516, 517, 658, 660; 425/9

[56] References Cited
UNITED STATES PATENTS

| | | |
|---|---|---|
| 2,847,311 | 8/1958 | Doumak et al. .............. 426/516 X |
| 3,221,675 | 12/1965 | Forkner .............. 426/272 |
| 3,279,394 | 10/1966 | Bowe .............. 425/9 |
| 3,436,927 | 4/1969 | Gruber .............. 426/517 X |

Primary Examiner—S. Leon Bashore
Assistant Examiner—M. Steve Alvo
Attorney, Agent, or Firm—Edmond T. Patnaude

[57] ABSTRACT

Spun sugar is collected in rotating collection pans from which it automatically feeds onto a conveyor belt which carries it through a compacting and sizing unit and then through a cutter and separator to provide spaced apart portions of sugar candy. The strands are pulled upwardly from the pans onto a conveyor belt mounted at the side of the pans at a linear speed slightly greater than the tangential speed at the periphery of the pans.

4 Claims, 5 Drawing Figures

METHOD FOR MAKING COTTON CANDY

The present invention relates in general to a new and improved method and apparatus for manufacturing predetermined portions of spun sugar candy on a continuous, quantity production basis.

BACKROUND OF THE INVENTION

Spun sugar candy or cotton candy as it is popularly called has long been a favorite confection at carnivals, amusement parks, and the like where it is collected from a stationary dish and wound on a stick. Cotton candy has thus been made by extruding molten sugar through small apertures in the cylindrical wall of a rapidly rotating extrusion head located in the center of a collection pan. An operator then collects the sugar strands aand bundles them onto a stick or rod by simultaneously twisting the stick and passing it around the interior of the pan. The inherent tackiness of the freshly extruded strands cause them to stick together in a loose mass resembling raw cotton.

Cotton candy had not, however, been successfully made and marketed for widespread distribution and later consumption for many reasons, including the rapid deterioration of the product due to excessive heat or humidity; excessive volume to weight ratio; and the high cost of manufacturing and packaging. It would, therefore, be desirable to provide a method and apparatus for automatically making cotton candy on a continuous basis, compacting the spun sugar strands into a desirable volume to weight ratio, and cutting the compacted product into portions of predetermined size for feeding to an automatic packaging line. Because cotton candy is extremely light in weight, portions of it tend to float like feathers in the surrounding atmosphere and it is thus important to minimize human involvement with the apparatus, thus requiring essentially fully automatic production machinery.

OBJECTS OF THE INVENTION

Therefore, an object of the present invention is to provide a new and improved method and apparatus for automatically producing predetermined portions of spun sugar candy on a continuous, quantity production basis.

Another object of the present invention is to provide automatic means for making, collecting and feeding spun sugar to a continuously moving conveyor.

A further object of the present invention is to provide new and improved means for cutting a continuous length of cotton candy into sections of predetermined lengths.

SUMMARY OF THE INVENTION

Briefly, the above and further objects may be realized in accordance with the present invention by mounting one or more sugar spinning heads and respectively associated collection pans immediately adjacent a continuously moving conveyor belt, feeding the bundle of sugar strands collected in the pans onto the belt by rotating the collection pans, mounting a plurality of sizing and compacting members near the top of the belt to compact the bundle of strands carried therethrough by the belt into a continuous bundle of predetermined cross-sectional size and shape, and then cutting the compacted product into sections of predetermined cross-sectional size and separating the sections by means of a rotating star blade cutter mounted above the conveyor belt.

BRIEF DESCRIPTION OF THE DRAWINGS

Further objects and advantages and a better understanding of the invention may be had from the following detailed description taken in connection with the accompanying drawings, wherein.

DETAILED DESCRIPTION OF THE DRAWINGS

Figure 1:
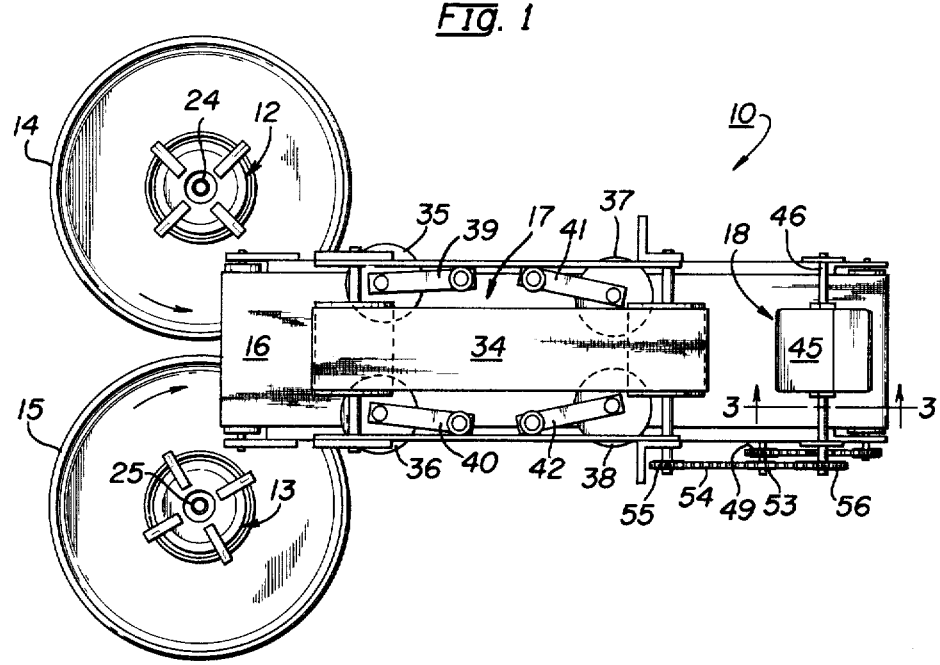
FIG. 1 is a plan view of a cotton candy making machine embodying the present invention.
Figure 2:
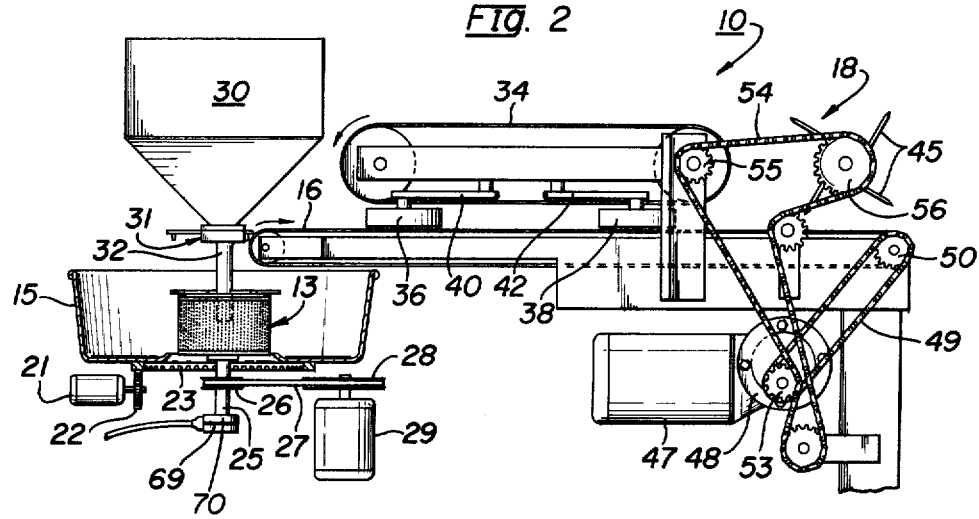
FIG. 2 is an elevational view of the machine of FIG. 1.
Figure 3:
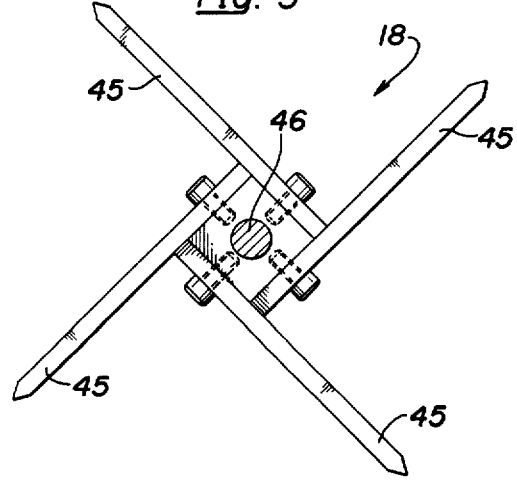
FIG. 3 is an enlarged sectional view of the cutter and separator assembly taken along the line 3—3 of FIG. 1.

Referring now to the drawings and particularly to FIGS. 1 and 2 thereof, a cotton candy machine 10 comprises as its principle elements a pair of spinning heads 12 and 13 respectively located in a pair of collection pans 14 and 15, a fabric-like conveyor belt 16, a compacting and sizing unit 17 and a cutter and separator 18. Molten sugar is extruded through small orifices in the spinning heads 12 and 13 into the collection pans which rotate at a tangential velocity approximately equal to the speed of the belt 16. A continuous bundle of sugar strands collected in the pans 14 and 15 feed onto the left hand end of the belt 16 which carries it into the unit 17 wherein the bundle is compacted and sized to a predetermined cross-sectional area. The compacted bundle of sugar fibers is then carried by the conveyor belt 16 under the rotating cutter 18 wherein it is cut into sections of predetermined length. From the right hand end of the belt 16, the separated sections may be fed to a conventional packaging line wherein the sections are separately wrapped in moisture-proof, airtight packages for subsequent storage and distribution.

Considering the overall machine 10 in greater detail, the collection pans 14 and 15 are rotated at a speed of a few revolutions per minute, e.g. six r.p.m., by means of a pair of electric motors 21. Pinion gears 22 mounted on the shafts of the motors 21 mate with and drive respective ring gears 23 fixedly mounted to the bottoms of the pans 14 and 15. As shown in FIG. 1, the lower pan 15 rotates in a clockwise direction while the upper pan 14 rotates in a counterclockwise direction. The spinning heads are fixed to upright drive shafts 24 and 25 which extend through enlarged central openings in the bottoms of the pans. The annular space thus provided between each pan and the lower portion of the associated spinning head permits air to circulate up through the pan to cool the spun sugar leaving the spinning head. A pair of pulleys 26 are respectively mounted on the drive shafts and are connected by drive belts 27 to drive pulleys 28 on the shafts of electric motors 29. If desired, speed control units may be interconnected between the motors 29 and the pulleys 26 to permit adjustment of the speed of rotation of the spinning heads.

Figure 4:
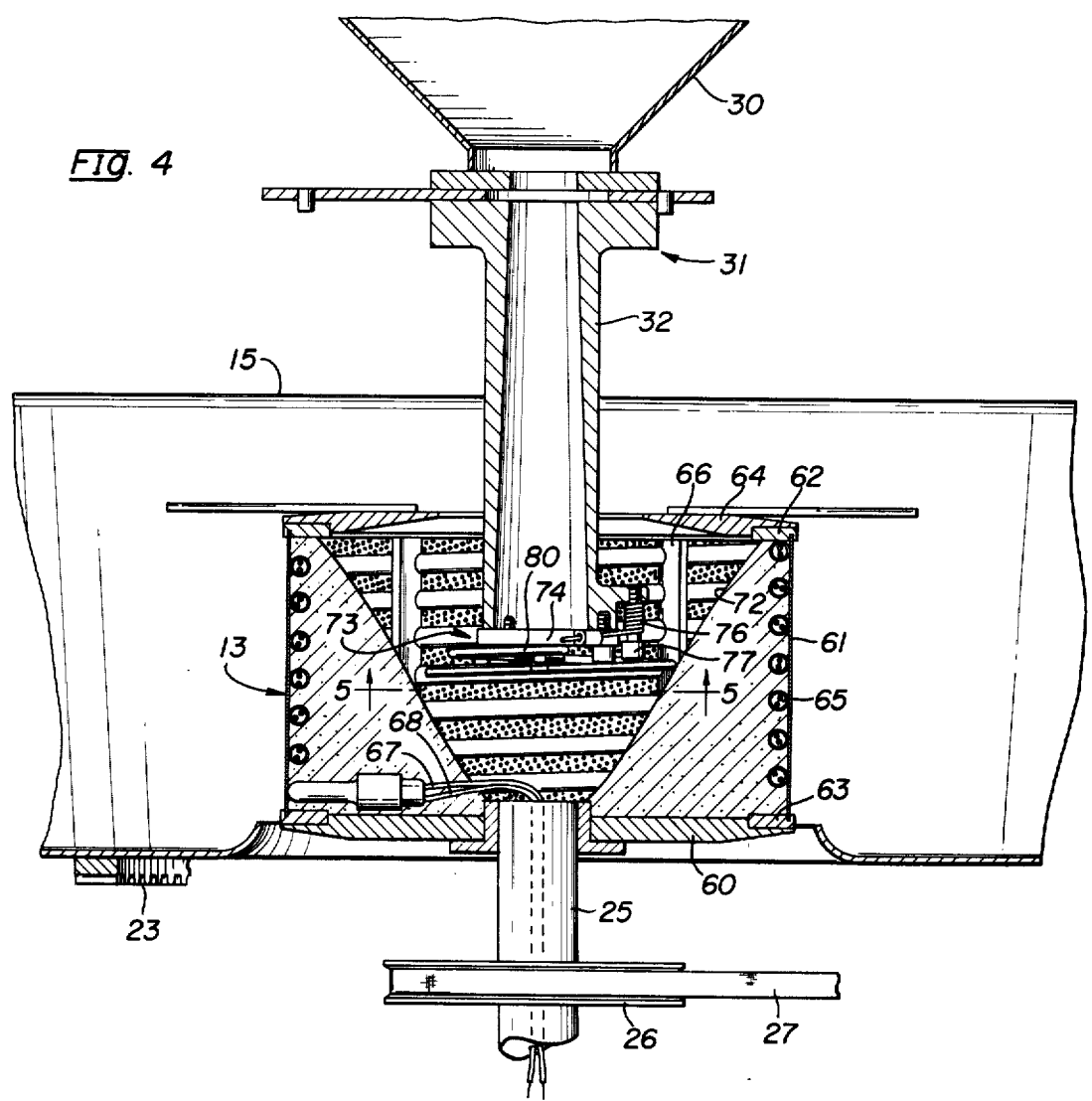
FIG. 4 is an enlarged, vertical section of the spinning head and automatic feed valve used in the machine of FIGS. 1 and 2.
Figure 5:
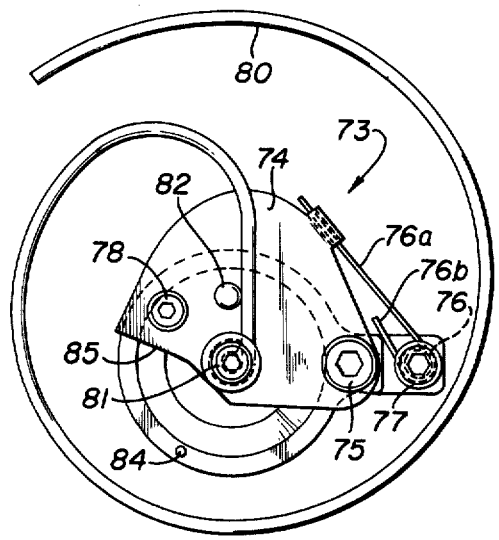
FIG. 5 is a bottom view of the automatic feed valve as seen from the line 5—5 of FIG. 4.

A pair of hoppers 30 are mounted above each of the spinning heads for holding a supply of pre-flavored and colored sugar granules which feed by gravity through manually operated slide valves 31 and associated feed tubes 32 into the centers of the spinning heads. Automatic control valves as described in detail hereinafter in connection with FIGS. 4 and 5 are mounted at the lower ends of the feed tubes 32 to control the sugar lever in the heads. Heating elements in the heads melt the sugar crystals to provide a sugar syrup which is extruded under centrifugal force into very fine continuous strands or fibers through performations in the cylindrical walls of the spinning heads. Since the sugar strands are tacky when first extruded, they stick together to form a bundle of strands. Once the bundles have been fed onto the conveyor belt 16, they continue to feed automatically from the rotating pans onto the belt. It has been found that best results are obtained when the linear speed of the belt is slightly greater than the tangential speed of the pans at the locations of the bundles therein whereby a slight stretching of the bundles takes place as they are pulled from the pans by the belt.

The compacting and sizing unit 17 includes a continuously moving belt 34 which travels at the same speed as the conveyor belt 16 and is mounted above the belt 16 and controls the vertical thickness of the compacted bundle as it travels between the two belts. The width of the bundle is controlled by two sets of freely rotatable rollers 35, 36, 37, and 38. These rollers are respectively journaled in a plurality of arms 39, 40, 41, and 42 which are pivotally mounted to the frame of the machine. As shown, the arms 39 and 40 are adjusted and locked in position to space the rollers 35 and 36 by a distance exceeding the desired width of the compacted product. The arms 41 and 42 are adjusted and locked in position to space the second set of rollers 37 and 38 closer together to provide final control of the width of the product leaving the unit 17.

The separator and cutter unit 18 includes a star cutter made up of a plurality of substantially radial blades 45 mounted on a horizontal shaft 46 journaled in the frame of the machine. The location of shaft 46 and length of the blades 45 is selected such that the tips of the blades 45 touch the belt 16 as they rotate thereover. The cutter 18 is spaced from the end drive roller for the conveyor so that the belt can move downwardly when engaged by the tips of the blades 45 to prevent damage thereto. The units 17 and 18 are driven in synchronism with the main conveyor belt 16 by means of an electric motor 47 and a speed reduction unit 48. A first drive sprocket on the output shaft of the speed reduction unit 48 is coupled by a drive chain 49 to a sprocket 50 which drives the conveyor belt. A second drive sprocket 53 is connected by a common drive chain 54 to a sprocket 55 which drives the belt 34 and to a sprocket 56 mounted on the shaft 46 to rotatably drive the cutter. The sizes of the sprockets are selected so that the belts 16 and 34 and the tips of the cutter blades 45 travel at the same linear velocity.

Referring now to FIGS. 4 and 5 there is shown the details of the spinning head 13 which includes a circular base plate 60 fixedly connected to the upper end of the associated drive shaft 25. A finely perforated tubular shell 61 having mounting rings 62 and 63 at the top and bottom is secured to the plate 60, and a cover plate 64 is secured to the top ring of the shell 61. A calrod type resistance heating element 65 is supported against the inner wall of the shell by a plurality of spacer elements 66 which are mounted between the end rings 62 and 63 and held in place by suitable means such as screws (not shown). Electric leads 67 and 68 from the lower end of the heating element extend downwardly through the shaft 25 and connect to a pair of slip rings 69 and 70 (FIG. 2) which are in turn connected through a pair of brushes to a source of electric power. The upper end of the shaft 25 is sealed around the leads 67 and 68 to prevent the sugar from leaking from the head.

As the head is rotated at a speed of say 4800 r.p.m., the sugar granules form a vortex as shown at 72 in FIG. 4 and it is extremely important that the entire heating element 65 and the shell 61 be covered by the sugar at all times to prevent carbonization of the sugar with a consequent blinding of the perforations in the shell. Therefore, in accordance with an important aspect of the present invention, an automatic feed control valve 73 is mounted to the lower end of the feed tube 32 within the head. The valve 73 comprises a valve member 74 pivotally connected to the tube 32 by a pintle 75 threadedly received in the wall of the tube 32. A spring 76 has a coil portion which surrounds and is held by a member 77 threadedly connected to the tube 32 and extending end portions 72a and 76b respectively engaging the valve member 74 and the tube 32. The spring 76 thus biases the valve member toward an open position. As best shown in FIG. 5, a screw 78 extends upwardly from the valve member 74 into the tube 32 and engages the inner wall thereof to provide a stop for limiting the maximum open position of the valve. A coil 80 of spring metal is carried by the valve member and is adapted to engage the surface of the sugar in the head under the force exerted thereon by the spring 76. Accordingly, as the quantity of sugar in the head decreases and the conical inner surface moves outwardly, the coil 80 also moves outwardly to increase the flow rate of sugar into the head.

Considered in greater detail, the coil 80 is attached at its inner end to the valve member 74 by means of a screw 81 positioned inwardly from the pivot screw 75. A stud 82 depends from the valve member 74 to provide a locating shoulder against which the coil 80 abuts. In order to adjust the size of the valve opening relative to the quantity of sugar in the head, the coil 80 may be bent in a vertical direction to vary the position on the sugar surface 72 which the coil abuts.

A stop pin 84 depends from the end of the tube 32 to limit movement of the valve member 74 in the closing direction and the valve member has a recess portion 85 so that when the valve member engages the pin 84 the valve remains slightly open.

OPERATION

In use, pre-flavored sugar crystals are placed in the hoppers 30, the motors 21, 29, and 47 are started, and the slide valves 31 is opened to supply the sugar crystals to the spinner heads. Since the heads are initially empty, the automatic feed valves 73 are open at this time. The heating coils are then energized and when they become sufficiently hot to melt the sugar crystals adjacent to the perforated walls 61, the molten sugar is extruded through the perforations into the pans 14 and 15 to provide annular bundles of spun sugar in the pans. These bundles are then manually placed on the belt 16 and fed under the compacting belt 34 between the side rollers 35 and 36. Thereafter, the inherent tackiness of the spun sugar bundles in the pans and the constant rotation of the pans automatically feeds a continuous bundle of spun sugar onto the leading end of the conveyor belt for continuous feeding through the compacting and sizing unit 17 and then to the cutter and separator 18.

When the machine is to be shut down, the slide valves 31 are closed while the remainder of the machine is operated until the feed tubes 32 become empty. The heating coil in the spinner heads and the motors are then de-energized with the spinner heads substantially filled with sugar. In this manner, jamming of the feed valves 73 at the beginning of the subsequent operating cycle of the machine is avoided.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A method of making cotton candy comprising the steps of extruding melted sugar through a plurality of appertures in a rotating head to provide continuous strands of sugar, collecting said strands in a rotating pan in the center of which said head is disposed, pulling the collected strands upwardly from said pan onto a conveyor belt mounted at the side of said pan and traveling in a direction tangential to said pan at a linear speed slightly greater than the tangential speed at the periphery of said pan, carrying the collected strands on said conveyor through a compactor to size the collected strands to a predetermined height and width, and cutting the sized product into sections of predetermined length.

2. A method according to claim 1 wherein said step of extruding comprises heating said head to a temperature exceeding the melting point of sugar, and feeding sugar granuals to said head.

3. A method according to claim 2 wherein said pan is rotated at about six revolutions per minute.

4. A method according to claim 2 wherein another rotating head and collector pan is provided on the opposite side of said conveyor belt, and, joining said collected strands from said pans to form a bundle on said conveyor belt before they are carried to said compactor.

* * * * *